March 4, 1958  B. O'BRIEN  2,825,260

OPTICAL IMAGE FORMING DEVICES

Filed Nov. 19, 1954

INVENTOR
BRIAN O'BRIEN

BY Louis L. Gagnor
Robt S Williams
ATTORNEYS

United States Patent Office 2,825,260
Patented Mar. 4, 1958

2,825,260

OPTICAL IMAGE FORMING DEVICES

Brian O'Brien, Pomfret, Conn.

Application November 19, 1954, Serial No. 469,877

8 Claims. (Cl. 88—1)

This invention relates to improvements in optical image forming and transporting or transferring devices, and more particularly to the provision of improved means in the form of a relatively large number of elongated relatively slender light transmitting elements or filaments arranged in group formation and optically finished at their opposite ends so as to be positionable for transporting optical images from a first or object plane to a second or image plane while providing good image resolution and image quality; and without appreciable loss of light or spherical and chromatic aberrations, distortion, astigmatism, coma, vignetting and the like such as are often encountered in other conventional types of image forming optical systems. The invention includes a method of making such improved means and optical image transferring devices.

Transilluminators each formed as an elongated relatively narrow parallel-sider element of light conducting material and having smooth side walls for reflecting internal light being transmitted from one end thereof to the other are old and well known in the art. It is also known to use a plurality of such light conducting elements arranged in closely spaced generally parallel relation to each other so as to jointly serve as a device for conducting the light forming an optical image of a picture or other information at an object plane to an image plane spaced therefrom and in such a way as to reproduce this image. Each of such light conducting elements works on the principle of internal reflection from the side walls thereof of most of the light which has entered at one end of the element and as this light travels therethrough to the opposite or exit end of the element.

While groups of light conducting elements functioning together as an image transporting device have been used heretofore with some degree of success to transfer an image from an object plane to an image plane, the results obtained have not been entirely satisfactory for several reasons. For example, even though a fairly good degree of freedom from image distortion and freedom from certain aberrations has been obtained, the image resolution and light transmitting efficiency nevertheless have not been as good as might be desired.

In order to have good image resolution, a very large number of light conducting elements should be employed to form the optical image transporting device and in order to be able to efficiently use as much of the available light as possible at the object plane these light conducting elements should be arranged as close to each other as possible. On the other hand they should not touch in any way so as to lose any of their light to adjacent elements which, of course, would deteriorate the quality or character of the resulting image.

It has been found that by following the teachings of the present invention individual light conducting elements for forming an optical image transporting device may be constructed and arranged in such a manner that the number of elements for forming the device may be materially increased, their efficiency increased and they may be positioned in closer relationship to each other than was possible heretofore; with the result that improved image resolution and quality may be had and at the same time more efficient use of the light forming the first image may be obtained.

An additional advantage which may be obtained by devices made in accordance with the present invention resides in the fact that substantially any shape of object field and any shape of image field ordinarily desired may be readily and easily obtained. Furthermore, relatively good light intensities at the same time may be provided throughout all parts of the image field by such a device.

It is accordingly an object of the present invention to provide an optical image transporting device for transferring substantially all of the light forming an optical image at an object plane to an image plane, said device having means for providing images of high quality and resolution at a preselected magnification while providing nearly complete freedom from the several aberrations mentioned above. The invention also includes a method for producing such optical image transporting or transferring devices readily and economically.

It is another object of the present invention to provide improved means and a method for forming an optical image transporting device embodying a group of adjacent coated and closely related elongated and relatively narrow rod or filament like transparent elements of carefully controlled cross-sectional shape and construction and predetermined indices of refraction so as to jointly provide said high image quality and light handling efficiency.

It is an additional object of the invention to provide an optical image transporting device having a plurality of closely positioned transparent filaments or rods each of which comprises a core which is coated with a very thin layer of a transparent material of a lower refractive index than the refractive index of the core of the rod or filament and each of which is preferably additionally provided with an outer thin opaque coating so that no stray light from one rod may leak off to an adjacent rod, said opaque coating also having, when desired, suitable binding properties so as to retain said filaments in predetermined group formation. Of course, when desired the rods or filaments may be adhered in group formation by this outer thin coating even though same is not of an opaque character, it being appreciated that it is not necessary under ordinary conditions of operation of the device that the outer coating be opaque or even present.

It is a further object of the invention to provide optical image transporting devices of the character described which are composed of a plurality of rods or filaments of a flexible nature so that the entrance and exit ends of the device may be disposed substantially at predetermined object and image planes in angular relation with reference to each other.

It is a further object of the invention to provide in such an optical image transporting device elongated rods or filaments of transparent material and coated with a low index transparent layer and an outer opaque layer and which rods or filaments may be of gradually increasing or decreasing cross-sectional size from end to end thereof, whereby an image of a size differing from that obtained at the entrance end of the device may be produced at the exit end thereof.

It is also an object of the present invention to provide in such optical image transporting devices of improved light transporting efficiency and image resolution, entrance and exit ends for the device which are of carefully controlled cross-sectional shapes so that said ends may be readily accommodated in closely adjacent relationship to associated optical components or the like of complementary shapes or curvatures.

Other objects and advantages of the invention will become apparent from the detailed description which follows when taken in conjunction with the accompanying drawings in which.

Figure 1:
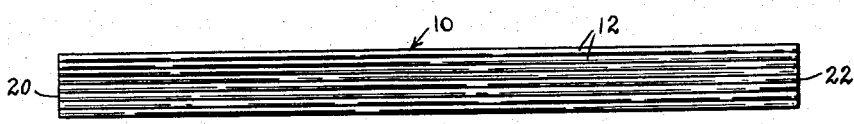
Fig. 1 is a side elevational view of an optical image transporting device embodying the present invention.
Figure 5:
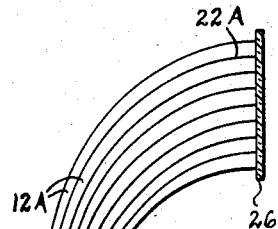

Fig. 5 is an optical image transporting device somewhat like that shown in Fig. 1 but formed of rods or filaments of gradually increasing cross-sectional sizes throughout their respective lengths and so finished at the opposite ends thereof as to provide or accommodate differently oriented and differently shaped object and image fields therefor; and Figs. 6, 7, 8 and 9 are rods or filaments of different cross-sectional shapes which will provide devices having efficient light gathering and light transmitting characteristics.

Figure 2:
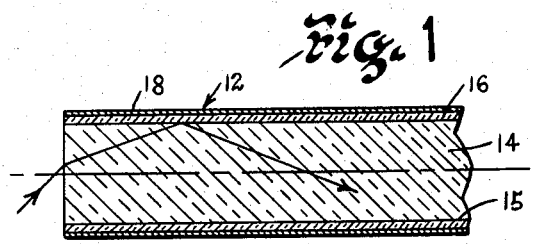
Fig. 2 is an enlarged longitudinal sectional view of a single rod or filament embodying the present invention and serving to form with a plurality of elements of similar construction the device of Fig. 1.

Referring more particularly to the drawings wherein like characters of reference designate like parts throughout the several views, an optical image transporting device embodying the invention is shown at 10 in Fig. 1 and comprises a relatively large number of relatively long thin rods or filaments 12 arranged in closely adjacent generally parallel side-by-side relation to one another so as to form a group or bundle. Each of these rods or filaments of the group, as shown in Fig. 2, in turn comprises a main body portion or core 14 formed of a transparent or light conducting material and having smooth side walls so as to act as mirror-like surfaces providing internal reflection for light which has entered at one end of the rods or filaments and is traveling towards the opposite ends thereof. A first relatively thin coating or layer 16 of transparent or light conducting material is carried by and surrounds the core 14, and about this first coating it is desirable to provide a second relatively thin layer or coating of an opaque and preferably light absorbing material 18.

The transparent material forming the core 14 intentionally has a higher index of refraction than the transparent material of the first coating 16 so that the internal reflection mentioned above of the light traveling from end to end through the core will occur at the side wall surfaces of the core, or in other words at the interface 15 between the core 14 and layer 16, without entering or being absorbed by the coating 16. The outer opaque coating 18 serves a double function in that it insures that should any light leak out from the core 14 into the material forming the coating 16 due to imperfect interfacial surface conditions between these two parts this light will not thereafter be allowed to reach an adjacent rod or filament through any point of contact therebetween. Of course, such a condition, if not prevented, might cause a deterioration of quality of the light being conducted by the latter rod or filament. The other function of opaque coating 18 is to serve as a binding material during the formation of the group or bundle, whereby the plurality of rod or filament like members 12 will be firmly held in their initial intended relationship to each other.

The size of each group or bundle of light conducting rods or filaments will, obviously, depend upon the purpose for which the optical image transporting device is intended and of course the cross-sectional size of the rods or filaments thereof will in turn depend upon the degree of resolution desired in the image being transported thereby. The opposite ends, or entrance and exit ends 20 and 22 respectively, of each bundle are preferably optically finished or polished so as to readily accept light incident thereon and being provided by suitable means adjacent one end thereof so as to readily emit this light to suitable means adjacent the opposite end thereof.

Figure 4:
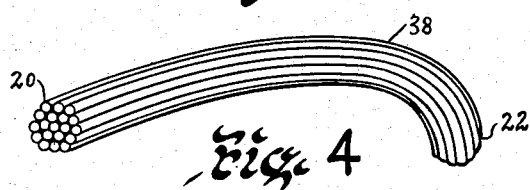
Fig. 4 is a perspective view of an optical image transporting device showing the rods or filaments thereof bent so as to provide differently oriented optically finished entrance and exit ends at opposite ends of the device.
Figure 7:
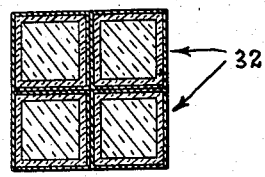

As shown in Fig. 4 the entrance end 20 of such a bundle of rods may be differently oriented relative to the exit end 22 of the same bundle and as will be readily apparent from Fig. 5, furthermore, the entrance end 20 of such an optical image transporting device may have its surface concavely shaped so as to fit closely adjacent image providing means as, for example in the present instance, the curved fluorescent screen 23 of a cathode ray tube indicated at 24. In this connection it will be noted that while one end of the image transporting device may be purposely controlled in shape to provide a desired curvature of field at the entrance end 20A thereof, it is possible to provide at the opposite or exit end 22A thereof an entirely different shape or curvature which depends solely upon the purpose for which that end of the device is intended. In the present instance, a substantially flat image field adjacent a translucent viewing screen 26 is desired.

As stated above, the cross-sectional size of the individual rods or filaments of a bundle constituting an optical image transporting device, will depend largely upon the purpose for which same is intended. In Fig. 5 for example, it may be desirable for good image resolution to have a very large number of rods or filaments adjacent the screen 23 of the cathode ray tube, so that each individual rod or filament thereof will transport light from a relatively small unit area of the screen 23 to a corresponding unit area of the viewing screen 26. In the particular use of the image transporting device of Fig. 5, wherein a predetermined degree of magnification of final image is desired, it is possible to provide a gradual increase in cross-sectional size or taper to the individual rods or filaments 12A considered from entrance to exit ends thereof, and this may be done in such a fashion that the illuminated elemental areas of equal size of the cathode ray tube will be in turn reproduced by corresponding elemental area of equal but larger size upon the viewing screen 26 notwithstanding the fact that the entrance and exit ends are differently oriented or the fact that some parts of the screen 26 are nearer to the tube face 23 than are other parts thereof.

It should be appreciated that in such an arrangement as shown in Fig. 5, even though the entrance end of such a device is shaped to closely accommodate the size and shape of the tube 24, and the exit end thereof is differently shaped from the entrance end thereof, and the rods 12A of the device are curved so as to have the general plane of the viewing screen 26 differently oriented relative to the general plane of the screen of the cathode ray tube, and of different transverse dimensions at different sections thereof, nevertheless the image being reproduced upon the viewing screen 26 will be relatively free from distortion, as well as aberrations such as spherical and chromatic aberrations, coma, astigmatism and the like. Furthermore, the light intensities over all parts of the image being provided upon the screen 26 will compare favorably with the intensities as provided initially at corresponding locations on the screen of the associated cathode ray tube.

Figure 6:
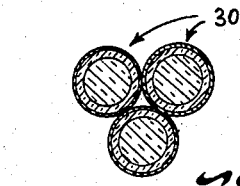
Figure 8:
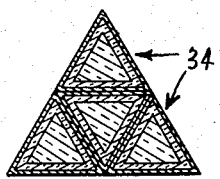
Figure 9:
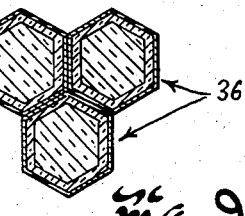

It has been mentioned previously that it is desirable to utilize as much of the available light at the entrance end of the device as possible. Accordingly there are shown at Figs. 6, 7, 8 and 9 cross sectional shapes of filaments in adjacent relation to each other which may be utilized satisfactorily when forming the rods or filaments of the improved type desired. While the rods or filaments 30 of Fig. 6 are shown as of circular form and arranged closely adjacent one another, most of the light impinging upon the ends of the cores thereof will enter these rods and be conducted thereby even though a small percentage thereof may be lost at opaque and vacant areas between and among these rods. However, in Fig. 7, rods or filaments 32 of square cross sectional shape are disclosed in closely nested relation to one another and no lost space is present therein, also a minimum of opaque material is exposed. In Fig. 8, triangularly shaped rods 34 in closely nested relation are shown and will provide good results; and in Fig. 9, hexangularly shaped rods 36 which may be used advantageously are shown. In the latter three modifications it will be appreciated even though the cores of the rods thereof are each first coated with a thin transparent layer of lower index material and a second thin outer coating of opaque material is provided thereon, nevertheless a very high percentage of the light impinging upon the entrance ends of the cores of the filaments of a group or bundle will enter and will be conducted thereby.

Figure 3:
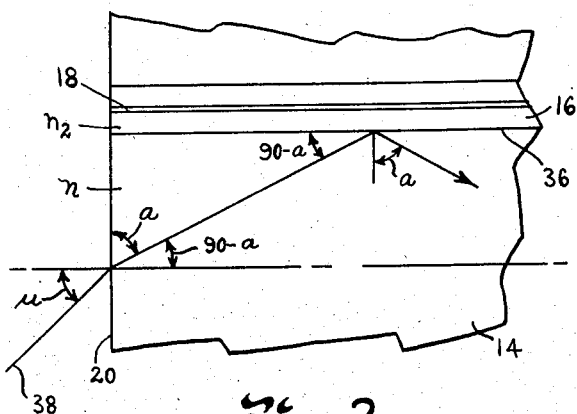
Fig. 3 is a diagrammatic sketch for use in readily obtaining a clear understanding of the invention.

In Fig. 3 there is shown for better understanding of the invention a diagrammatic sketch indicating a maximum entrance angle $u$ and a critical angle $a$ of total reflection occurring at the interfacial surface 36 between the core 14 and the transparent coating 16. All rays entering the core and striking this interface at a greater angle than $a$ will be reflected. A ray 38 for example providing the critical angle shown at $a$ it will be seen will enter the core 14 at the entrance end 20 in such a manner as to have an angle of instance $u$ as indicated and of course this angle may be considered a measure of the maximum aperture angle of the entering light which will be reflected and transmitted through the rod from end to end thereof and will be controlled by the indices of refraction $n_1$ of the core 14 and $n_2$ of the first coating 16 in accordance with the following equations:

$$\sin(90-a) = \cos a$$
$$\sin u = n_1 \cos a$$
$$\cos a = \sqrt{1 - \sin^2 a}$$
$$\sin u = n_1\sqrt{1 - \sin^2 a}$$
$$\sin^2 a = \frac{n_1^2}{n_2^2}$$
$$\sin u = n_1\sqrt{1 - \frac{n_1^2}{n_2^2}}$$
$$\sin u = \sqrt{n_1^2 - \frac{n_1^4}{n_2^2}}$$
$$\sin u = \sqrt{n_1^2 - n_2^2}$$

While an optical image forming device of the type disclosed for use with a television receiver may have a very large number of rods or filaments of small cross sectional size and provide a device of relatively large width, it should be appreciated that other devices which may usefully employ the present invention might be of noticeably different shapes cross sectional size, and various lengths such as in gastroscopes, bronchoscopes or the like, wherein a relatively long thin image conducting device would be desired, nevertheless the number of rods or filaments employed in such a device will have a direct bearing upon the degree of resolution of image provided thereby. It should be noted, however, that the cross sectional size of the rods or filaments should not be so small as to approach the wave length of light.

The core 14 of high index transparent material may be formed in known manner from any one of various suitable materials such as a flint glass, while the thin transparent coating 16 surrounding this core may be formed of any one of several known low index materials such as methyl methacrylate, or a lacquer of proper index; and this low index material may be applied to the core 14 in known manner such as by a dipping or extrusion process. Of course, the method of applying the low index material will depend somewhat upon the comparative size of the cores being employed and to a degree of image resolution required during use of the device. Also it should be noted that while the adhesive outer coating 18 may be preferred such is not necessary, for example, in cases wherein the elongated filaments are held together in group formation by a suitable outside wrapping, binding or the equivalent securing means.

Having described my invention I claim:

1. An optical image transfer device comprising a relatively large number of very small transparent filaments, each individual filament comprising a light-conducting core and an outer layer of transparent coating material thereon, each core having a substantially smooth outer surface extending entirely from one end thereof to the other and being of relatively small cross-sectional size, each outer layer of coating material being intimately disposed on a supporting core and being relatively thin in comparison to its supporting core, and each constituting a substantially continuous layer on said outer surface making optical contact with substantially all portions thereof so as to substantially completely surround all parts of said core intermediate the ends thereof, the said cores with their layers of coating material thereon, when positioned closely adjacent each other, having said thin layers providing a definite spacing of transparent coating material between adjacent cores which is at least sufficient to prevent transmission of light from one core to the core next adjacent thereto, each core being formed of a transparent material having a relatively high predetermined index of refraction and each thin layer being formed of a transparent material having a relatively low predetermined index of refraction with respect to that of the core, said thin layers of coating material serving to space said cores at all times and thereby prevent light rays being transmitted from one core to another, said transparent filaments, in assembled form, having their end portions bunched together and secured in adjacent side-by-side relation in such a way as to provide a bundle of appreciable cross-sectional area with the individual cores of said bunched filaments separated from one another by the low index transparent material, and the end of each filament of said bundle being of such optical character as to transmit light therethrough, whereby in filaments so coated and long in comparison to their diameter each light ray transmitted therethrough may be reflected internally a very large number of times without substantial loss of intensity and with substantially no loss of light into adjacent filaments.

2. An optical image transfer device of the character defined in claim 1 and wherein said transparent filaments at locations intermediate the respective ends thereof are free from one another, whereby said device may be appreciably and repeatedly flexed intermediate the ends thereof.

3. An optical image transfer device of the character defined in claim 1 and wherein each core and its surrounding layer of coating material are of such a predetermined geometric cross-sectional shape as to lie, when a large number of said filaments are bunched together, in side-by-side relation and substantially completely occupy all portions of said cross-sectional area at the end of said bundle.

4. An optical image transfer device of the character defined in claim 1 and additionally comprising an opaque layer of coating material substantially completely surrounding each filament at all locations intermediate the ends thereof.

5. An optical image transfer device of the character defined in claim 1 and additionally comprising a securing material disposed in spaces between adjacent filaments at said bunched ends so as to bond the adjacent filaments thereof together.

6. An optical image transfer device of the character defined in claim 1 and wherein each core and its surrounding layer of coating material are of such a predetermined cross-sectional shape and provide such a geometric pattern, when a large number of said filaments are bunched together in side-by-side contacting relation, as to provide a distribution of small unoccupied spaces dispersed among said filaments at the cross-sectional end area of said bundle.

7. An optical image transfer device comprising a relatively large number of very small transparent light-conducting cores, each core having a substantially smooth outer surface extending entirely from one end thereof to the other and being of relatively small cross-sectional size, means comprising relatively thin transparent low index material between portions of each of said cores for initially positively retaining said portions of said cores in spaced relation with each other and enabling said cores to be bunched together throughout the length of said portions to provide a bundle of appreciable cross-sectional area, said individual cores of said bunch being separated by said low index spacing material, said low index spacing material in the final assembled device being intimately disposed on the adjacent supporting cores and being thin relatively in comparison to said supporting cores, and each constituting a substantially continuous layer on the outer surfaces of said portions and making optical contact with substantially all of said portions so as to substantially completely surround said portions of said cores, the said cores with said spacing material therebetween, when positioned closely adjacent each other, providing a definite spacing of transparent material between adjacent cores which is at least sufficient to prevent transmission of light from one core to the core next adjacent thereto, each core being formed of a transparent material having a relatively high predetermined index of refraction with respect to that of said low index spacing material, said low index material serving to insure spacing of said portions of said cores at all times and thereby prevent light rays being transmitted from one core to another, said cores and spacing material, in assembled form, having their end portions bunched together and secured in adjacent side-by-side relation in such a way as to provide a bundle of appreciable cross-sectional area with the individual cores thereof separated from one another by the low index transparent material, and the end of each core of said bundle being of such optical character as to transmit light therethrough, said cores being long in comparison to their diameter and said low index material between said cores being such that light rays transmitted therethrough may be reflected internally a very large number of times without substantial loss of intensity and with substantially no loss of light into adjacent filaments throughout said portions.

8. An optical image transfer device comprising a relatively large number of very small transparent filaments, each individual filament comprising a light-conducting core and an outer layer of transparent coating material extending throughout portions thereof, each core having a substantially smooth outer surface extending entirely from one end thereof to the other and being of relatively small cross-sectional size, each outer layer of coating material being intimately disposed on said portions of said supporting core and being relatively thin in comparison to its supporting core, and each constituting a substantially continuous layer on said outer surface of said portions and making optical contact with substantially all said portions so as to substantially completely surround all parts thereof, the said cores with their layers of coating material thereon, when positioned closely adjacent each other, having said thin layers providing a definite spacing of transparent coating material between adjacent cores which is at least sufficient to prevent transmission of light from one core to the core next adjacent thereto, each core being formed of a transparent material having a relatively high predetermined index of refraction and each thin layer being formed of a transparent material having a relatively low predetermined index of refraction with respect to that of the core, said thin layers of coating material serving to space said cores at all times, said transparent filaments, in assembled form, having their end portions bunched together and secured in adjacent side-by-side relation in such a way as to provide a bundle of appreciable cross-sectional area with the individual cores of said bunched filaments separated from one another by the low index transparent material, and the end of each filament of said bundle being of such optical character as to transmit light therethrough, whereby in filaments so coated and long in comparison to their diameter each light ray transmitted therethrough may be reflected internally a very large number of times without substantial loss of intensity and with substantially no loss of light into adjacent filaments throughout said coated portions.

References Cited in the file of this patent

UNITED STATES PATENTS

| | | |
|---|---|---|
| 1,642,187 | Young | Sept. 13, 1927 |
| 1,751,584 | Hansell | Mar. 25, 1930 |
| 1,848,814 | Allen | Mar. 8, 1932 |
| 2,128,246 | Hardesty | Aug. 30, 1938 |
| 2,354,591 | Goldsmith | July 25, 1944 |